United States Patent [19]

Kawahara et al.

[11] Patent Number: 5,051,291
[45] Date of Patent: Sep. 24, 1991

[54] MAGNETIC RECORDING MEDIUM

[75] Inventors: Setsuko Kawahara; Yasushi Nakano; Noboru Koyama, all of Hino, Japan

[73] Assignee: Konica Corporation, Tokyo, Japan

[21] Appl. No.: 464,344

[22] Filed: Jan. 12, 1990

[30] Foreign Application Priority Data

Jan. 17, 1989 [JP] Japan .................................. 1-9536
Mar. 31, 1989 [JP] Japan .................................. 1-83191

[51] Int. Cl.$^5$ ............................................. G11B 23/00
[52] U.S. Cl. ........................................ 428/141; 427/48; 427/131; 428/323; 428/336; 428/694; 428/900
[58] Field of Search ............... 428/141, 336, 694, 900, 428/323; 427/131, 48

[56] References Cited

U.S. PATENT DOCUMENTS 4,865,924 9/1989 Saito et al. ...................... 428/900
4,911,951 3/1990 Ogawa et al. .................... 428/900

Primary Examiner—Paul J. Thibodeau
Attorney, Agent, or Firm—Jordan B. Bierman

[57] ABSTRACT

A magnetic recording medium is disclosed. The medium comprises a non-magnetic support and, provided thereon in order, a first magnetic layer and a second magnetic layer each containing a magnetic material and a binder. Rmax, a maximum roughness, and Ra, a center line average roughness, of a surface of the support on the magnetic layer side, $d_1$, a thickness of the first magnetic layer, and $d_2$, a thickness of the second magnetic layer, have the following relation, $$4 \times 10^{-3} \leq Ra/d_1 \leq 1.8 \times 10^{-2}$$

$$4 \times 10^{-2} \leq Rmax/d_1 \leq 4.5 \times 10^{-1}$$

$$d_2 \leq 1.0 \ \mu m$$

18 Claims, 1 Drawing Sheet

MAGNETIC RECORDING MEDIUM

FIELD OF THE INVENTION

The present invention relates to a novel, very thin magnetic recording medium having superior magnetic characteristics.

The magnetic recording medium of the present invention is suited to all sorts of magnetic tapes or magnetic disks.

BACKGROUND OF THE INVENTION

In all sorts of magnetic recording tapes used for sound recording, picture recording, computers, etc., the magnetic layers on their surfaces commonly tend to gradually wear because of their strongly close contact with magnetic heads, and also reproduction units or players trend toward compactness in size. For these reasons, thin types are presently demanded as magnetic recording mediums so that the mediums can travel without difficulty and also their manufacturing processes can be simplified.

Recently in particular, those of multiple layer structure, comprising a support and provided by coating thereon a magnetic layer and besides an intermediate layer, and magnetic recording mediums provided with a plurality of magnetic layers having different performances are on the market. However, the manufacturing processes for such magnetic recording mediums of multiple layer structure are complicated. In particular, the products tend to have poor magnetic characteristics, and also may cause a number of dropouts at the time of reproduction, resulting in a poorness in quality. The surface layers thereof also commonly tend to have a large thickness, because large-particle abrasives or the like are dispersed so that wear resistance can be imparted to the magnetic layer formed by uniformly dispersing ferromagnetic material powder in a binder.

In order to give good electromagnetic conversion characteristics, the component layer surface on the magnetic layer side must be processed to smoothness, so that the particle size of magnetic powder and fillers is selected and calendering is applied.

An excessive smoothness of the surface, however, may bring about an increase in coefficient of friction and a poorness of traveling performance. On the other hand, an excessive roughness of the surface may result in spacing loss, dusting, and unpleasant wear of heads.

The smoothness or roughness of the surface of the magnetic layer is therefore the subject that should be thoroughly studied. However, the surfaces of non-magnetic supports hitherto used in magnetic recording mediums (hereinafter generally referred to as magnetic tapes) have commonly a surface roughness that may incidentally bring about irregularities on the surfaces of the magnetic tapes to the extent that may give a problem from the viewpoint of the magnetic characteristics. Hence, also because most magnetic tapes having been put into practical use are comprised of a single magnetic layer, it does not result that such surface roughness can be absorbed even if some ordinary subbing layer is provided. This causes highly frequent occurrence of dropouts or the like.

It has been attempted to eliminate this difficulty by making a magnetic layer thick, but a low level of electromagnetic conversion characteristics can not be avoided because of the largness in thickness.

SUMMARY OF THE INVENTION

A first object of the present invention is to eliminate the above disadvantages to provide a magnetic recording medium feasible for high density recording and having a very small thickness.

A second object of the present invention is to provide a magnetic tape that has good electromagnetic conversion characteristics without deterioration of performance, caused by the surface roughness of the non-magnetic support, and also can achieve good reproducibility for the records in both the high and low frequency regions.

The present invention provides a magnetic recording medium comprising a non-magnetic support and, provided thereon in order, a first magnetic layer and a second magnetic layer each containing a magnetic material and a binder, wherein Rmax, a maximum roughness, and Ra, a center line average roughness, of a surface of the support on the magnetic layer side, $d_1$, a thickness of the first magnetic layer, and $d_2$, a thickness of the second magnetic layer, have the following relation:

$$4\times 10^{-3} \leq Ra/d_1 \leq 1.8\times 10^{-2}$$

$$4\times 10^{-2} \leq Rmax/d_1 \leq 4.5\times 10^{-1}$$

$$d_2 \leq 1.0 \mu m$$

DETAILED DESCRIPTION OF THE INVENTION

Figure 1:
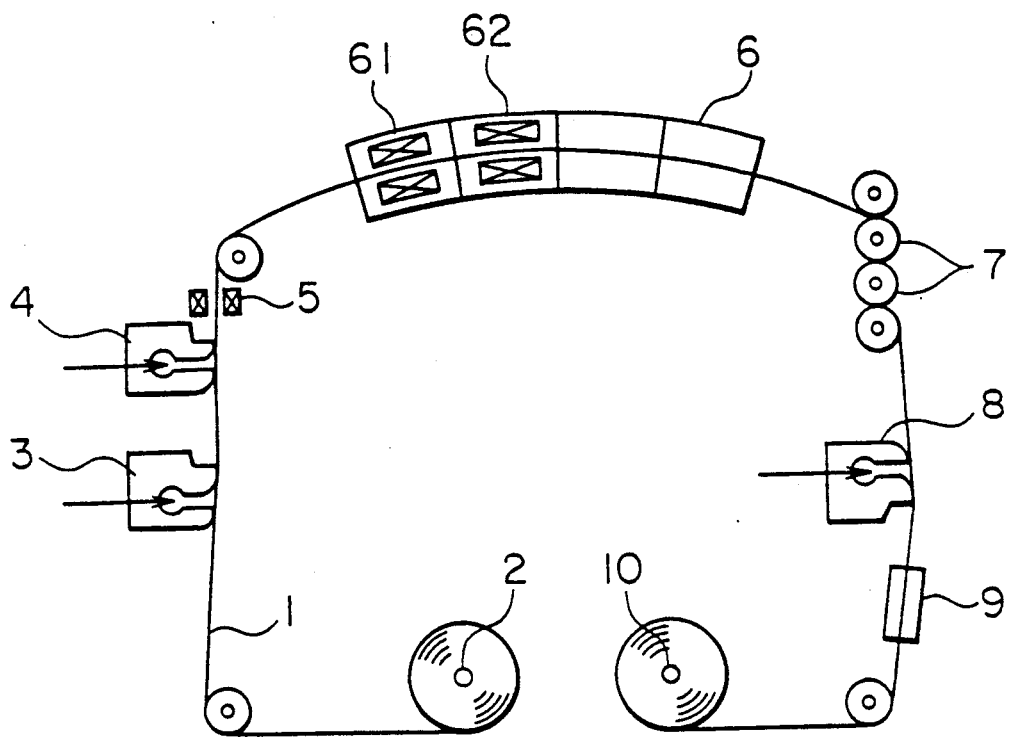
FIG. 1 schematically illustrates an apparatus for preparing the magnetic recording medium of the present invention.

The present invention was made in order to solve the problems previously discussed, and provides a novel magnetic recording medium comprising a non-magnetic support and, provided thereon in order, a first magnetic layer and a second magnetic layer each containing a magnetic material and a binder, wherein Rmax, a maximum roughness, and Ra, a center line average roughness, of a surface of the support on the magnetic layer side, $d_1$, a thickness of the first magnetic layer, and $d_2$, a thickness of the second magnetic layer, have the following relation:

$$4\times 10^{-3} \leq Ra/d_1 \leq 1.8\times 10^{-2}$$

$$4\times 10^{-2} \leq Rmax/d_1 \leq 4.5\times 10^{-1}$$

$$d_2 \leq 1.0 \mu m$$

In the magnetic recording medium of the invention the $d_1$ is preferably 1.0 to 3.0 μm, and the $d_2$ is preferably 0.1 to 1.0 μm. The magnetic recording medium of the present invention can be prepared by providing a plurality of coating layers on the support, and thereafter subjecting them to two-stage orientation in the state that the layers are not dried, followed by calendering. With regard to the orientation, a dispersion of a magnetic material is coated on the non-magnetic support, and thereafter the magnetic layers thus formed are subjected to orientation by passing them through an orientation member in the state that they are not dried. The resulting magnetic recording medium is then again subjected to orientation through means of a plurality of orientation members, thereby obtaining excellent electromagnetic conversion characteristics.

In the magnetic recording medium of the present invention, the finished magnetic layer may preferably have the surface roughness of Ra: from 0.001 to 0.018 μm, and Rmax: from 0.030 to 0.150 μm, and also the total thickness of the magnetic layers can be controlled to be not more than 4.0 μm, and preferably not more than 3.0 μm. This makes it possible to give high electromagnetic conversion characteristics, and also to adjust the coercive forces of the first and second magnetic layers, thus providing a magnetic tape suited to the reproduction of records in both the high and low frequency regions.

The magnetic layer of the present invention contains a magnetic material and a binder.

The binder to be used for the magnetic recording medium of the present invention include non-magnetic polymers or oligomers having in their molecules no polar groups at all that may be readily adsorbed particularly on the surfaces of magnetic material particles, or those having polar groups only in such a trace amount that they may not substantially be adsorbed on the magnetic material. As examples therefor, thermosetting resins, thermoplastic resins, reactive resins, or mixtures thereof can be used, which are conventionally known as binders for magnetic recording mediums. They include, for example, a vinyl chloride/vinyl acetate copolymer, acrylic resins, phenolic resins, epoxy resins, polyamide resins, butadiene resins, a styrene/butadiene copolymer, urethane elastomers, isocyanate curable resins, and polyamine resins. These may preferably have a degree of polymerization, of from 100 to 10,000. The above binders are used alone or as a mixture.

The binder content of the magnetic layer is 1 to 50% by weight, and more preferably 5 to 30% by weight, of the magnetic material content.

In the present invention, the binders may preferably be those having a glass transition point of −25° C. to 100° C., and more preferably 10° C. to 80° C. A glass transition point of less than −25° C. may result in a extreme lowering of the strength of the magnetic layers to cause defective traveling (such as edge break or clogging of head).

What is aimed can be achieved by the use of the above binders.

In the present invention, there is no problem if other conventional binder resins are used in combination, so long as the achievement of the effect of the present invention is not hindered.

In the present invention, the devices and material techniques that have been hitherto used in the manufacture of magnetic recording mediums can be commonly used.

Magnetic materials used in the present invention include all sorts of ferromagnetic materials such as oxide magnetic materials as exemplified by $\gamma$-$Fe_2O_3$, Co-containing $\gamma$-$Fe_2O_3$, Co-deposited $\gamma$-$Fe_2O_3$, $Fe_3O_4$, Co-containing $Fe_3O_4$, Co-deposited $Fe_3O_4$, and $CrO_2$, and magnetic powder of metals as exemplified by Fe, Ni, and those mainly composed of Fe, Ni or Co, such as an Fe-Ni alloy, an Fe-Co alloy, an Fe-Ni-P alloy, an Fe-Al alloy, an Fe-Mn-Zn alloy, an Fe-Ni-Zn alloy, an Fe-Co-Ni-Cr alloy, an Fe-Co-Ni-P alloy, a Co-P alloy, and Co-Cr alloy. As additives to these metal magnetic materials, the magnetic materials may also contain elements such as Si, Cu, Zn, Al, P, Mn, and Cr, or compounds of any of these. Hexagonal ferrites such as barium ferrite, and also iron nitride may be used.

These magnetic materials may preferably have a specific surface area of 30 to 70 $m^2/g$, and more preferably 40 to 65 $m^2/g$, in B.E.T. value. Such fineness in size is attributable to a remarkable improvement in the electromagnetic conversion characteristics.

Various hardening agents can be used to improve the durability of the component layers including the magnetic layer in the magnetic tape of the present invention. For example, isocyanates can be contained, which include aromatic isocyanates and aliphatic isocyanates.

The aromatic isocyanates that can be used include, for example, tolylene diisocyanate (TDI), etc., and addition products of these isocyanates with active hydrogen compounds, and may preferably be those having an average molecular weight ranging from 100 to 3,000.

The aliphatic isocyanates include hexamethylene diisocyanate (HMDI), etc., and addition products of these isocyanates with active hydrogen compounds. Of these, preferred are those having an average molecular weight ranging from 100 to 3,000. Among the aliphatic isocyanates, non-alicyclic isocyanates and addition products of these compounds with active hydrogen compounds are preferred.

A magnetic coating material is used for the formation of the above magnetic layers, and may optionally contain additives other than the above, such as a dispersant, a lubricant, an abrasive, a matting agent, and an antistatic agent.

The dispersant used in combination in the present invention includes amine compounds, alkyl sulfates, fatty acid amides, higher alcohols, polyethylene oxide, sulfosuccinic acid, sulfosuccinates, known surface active agents, and salts of these. These dispersants may be used alone or in combination of two or more kinds. These dispersants are added in an amount ranging from 1 to 20 parts by weight based on 100 parts by weight of the magnetic powder. These dispersants may be used before pretreatment of the magnetic powder.

The lubricant includes silicone oil, graphite, carbon black graft polymers, molybdenum disulfide, tungsten disulfide, lauric acid, and myristic acid. Fatty acid esters composed of a monobasic fatty acid having 12 to 22 carbon atoms and a monohydric alcohol having 13 to 40 carbon atoms in total with the carbon atom number of said fatty acid can also be used. These lubricants are added in an amount ranging from 0.2 to 20 parts by weight based on 100 parts by weight of the magnetic powder.

The abrasive that can be used includes molten alumina, silicon carbide, chromium oxide, corumdum, and artificial corumdum, which are materials commonly used. These abrasives used may preferably be those having an average particle diameter of from 0.05 to 5 μm, and particularly preferably from 0.1 to 2 μm. These abrasives are added in an amount ranging from 1 to 20 parts by weight based on 100 parts by weight of the magnetic powder.

As the matting agent, organic powder or inorganic powder is used alone or as a mixture thereof.

The organic powder used in the present invention may preferably include styrene acrylate resin powder, benzoguanamine resin powder, melamine resin powder, and phthalocyanine pigments. It, however, is also possible to use polyolefin resin powder, polyester resin powder, polyamide resin powder, polyimide resin powder, and polyethylene fluoride resin powder. The inorganic powder includes silicon oxide, titanium oxide, aluminum oxide, calcium carbonate, barium sulfate, zinc oxide, tin oxide, aluminum oxide, chromium oxide, silicon carbide, calcium carbide, $\alpha\text{-Fe}_2\text{O}_3$, talc, kaolin, calcium sulfate, boron nitride, zinc fluoride, and molybdenum dioxide.

The antistatic agent includes conductive powders such as carbon black, as well as graphite, tin oxide/antimony oxide compounds, and titanium oxide/tin oxide/antimony oxide compounds; naturally occurring surface active agents such as saponin; nonionic surface active agents of an alkylene oxide type, a glycerol type, or a glycidol type; cationic surface active agents such as higher alkylamines, quaternary ammonium salts, pyridine, other heterocyclic compounds, and phosphoniums or sulfoniums; anionic surface active agents containing an acidic group such as carboxylic acid, sulfonic acid, phosphoric acid, and a sulfonic acid ester group; and amphoteric surface active agents such as amino acids, aminosulfonic acids, and sulfuric acid esters of amino alcohols.

Solvents mixed in the above coating materials, or diluting solvents used when the coating materials are applied, include ketones such as acetone, methyl ethyl ketone, methyl isobutyl ketone, and cyclohexanone; alcohols such as methanol, ethanol, propanol, and butanol; esters such as methyl acetate, ethyl acetate, butyl acetate, ethyl lactate, and ethylene glycol monoacetate; ethers such as glycol dimethyl ether, glycol monoethyl ether, dioxane, and tetrahydrofuran; aromatic hydrocarbons such as benzene, toluene, and xylene; and halogenated hydrocarbons such as methylene chloride, ethylene chloride, carbon tetrachloride, chloroform, and dichlorobenzene.

The support that can be used may be made of a material including polyesters such as polyethylene terephthalate and polyethylene-2,6-naphthalate, polyolefins such as polypropylene, cellulose derivatives such as cellulose triacetate and cellulose diacetate, and plastics such as polyamide and polycarbonate. It is also possible to use metals such as Cu, Al and Zn, glass, boron nitride, and ceramics such as silicon carbide.

These supports may have a thickness of from about 3 to 100 μm, and preferably from 5 to 50 μm, in the instances of films and sheets, and from about 30 μm to about 10 mm in the instances of disks and cards. In the instance of drums, the supports are used in cylindrical forms, and types thereof depend on the recorders to be used.

An adhesive layer may be provided between the above support and the component layer such as the magnetic layer so that the adhesion between them can be improved.

The above magnetic layer or layers can be formed on the support by using coating methods including air-doctor coating, blade coating, air-knife coating, squeesee coating, impregnation coating, reverse-roll coating, transfer-roll coating, gravure coating, kiss-roll coating, cast coating, spray coating, comber coating, and dye coating, to which, however, the methods are not limited.

In order to obtain a magnetic recording medium having a high CN ratio, a high recording density, a low dropout and a good coating property, the magnetic recording medium comprising a non-magnetic support and, provided thereon, a plurality of layers including an outermost magnetic layer containing a magnetic material and a binder in which the outermost magnetic layer has a thickness of 0.01 to 1.5 μm and a squareness ratio of not less than 0.85 can be used.

The layers of the medium are preferably coated on the support with a solution simultaneously. The layers of the medium are also coated on the support with a solution while each layer is wet. After the layers are coated, the layers are subjected to a plurality of orientations.

Figure 2:
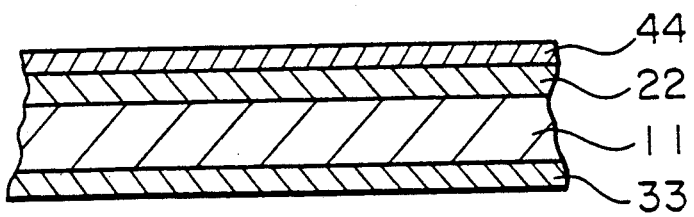
FIG. 2 is a partial cross section of the magnetic recording medium of the present invention.

The magnetic recording medium of the present invention can be prepared by the method as illustrated in FIG. 1. A support 1 fed out of a feed roller 2 that axially supports a main roll of a polyester support 1 is provided with a lower layer 22, e.g., the magnetic layer, by coating using a lower-layer coating head 3. Then a magnetic coating solution for an uppermost layer is coated on the lower layer, the magnetic layer, using a coating head 4. Thereafter, for the orientation in the state they are not dried, the layers are oriented by means of a first-stage orientation unit 5 and subsequently further oriented as a second stage at an orientation section 6. Thereafter, surface processing is carried out at a surface-processing section 7 comprising calendering rollers arranged in plurality, and then an anti-curling backing layer is provided by coating on the back side of the support 1, using a backing-coating head 8. The support thus coated is carried forward and the whole is dried at a drying section 9, which is then rolled up on a wind-up roll 10. In this way, a magnetic recording medium of the present invention was prepared, having a magnetic recording layer of 10 μm thick. FIG. 2 illustrates a cross section to show the layer constitution of the magnetic recording medium thus obtained. The numeral 11 denotes the support; 22, the lower layer; 44, the uppermost layer, i.e., the recording layer containing magnetic iron powder. The numeral 33 denotes the backing layer.

As will be demonstrated by Examples given below, the magnetic recording medium of the present invention shows not only a superior coating performance at the time of the manufacture, but also a high CN ratio and a high reproduction efficiency. In addition, there is a remarkable decrease in dropouts that is required in high-performance video tapes.

EXAMPLES

Example 1

Samples of magnetic tapes were prepared according to the following magnetic coating material formulations A and B, and subbing coating material formulation C. In the formulation, "part(s)" is all by weight.

| Magnetic coating material A: | |
| --- | --- |
| Co-$\gamma$Fe$_2$O$_3$ | 100 parts |
| Vinyl chloride/vinyl acetate/vinyl alcohol copolymer | 15 parts |
| Polyurethane resin | 5 parts |
| $\alpha$-Al$_2$O$_3$ | 3 parts |
| Carbon black | 10 parts |
| Myristic acid | 2 parts |
| Stearic acid | 2 parts |
| Cyclohexanone | 100 parts |
| Methyl ethyl ketone | 100 parts |
| Toluene | 160 parts |
| Magnetic coating material B: | |
| Co-$\gamma$Fe$_2$O$_3$ | 100 parts |
| Vinyl chloride/vinyl acetate/vinyl alcohol copolymer | 13 parts |
| Polyurethane resin | 4 parts |
| $\alpha$-Al$_2$O$_3$ | 2 parts |
| Carbon black | 13 parts |

-continued

| | |
|---|---|
| Myristic acid | 1 part |
| Stearic acid | 1 part |
| Butyl stearate | 2 parts |
| Cyclohexanone | 200 parts |
| Methyl ethyl ketone | 200 parts |
| Toluene | 160 parts |
| Subbing coating material C: | |
| Vinylidene chloride/acrylonitrile copolymer | 10 parts |
| Cyclohexanone | 90 parts |

Coating materials with the above formulation were coated on a polyethylene terephthalate support of 14.5 μm in thickness in the manner as shown in Table 1 to give samples of the present invention and comparative samples.

The samples thus obtained were evaluated to obtain the results as shown in Table 2.

TABLE 1

| Sample No. | Roughness (μm) Ra/Rmax | Coating thickness First layer* | Coating thickness Second layer* | AR/B ARa | AR/B ARmax |
|---|---|---|---|---|---|
| Present invention: | | | | | |
| 1 | 0.008/0.063 | 1.5 | 1.0 | $5.3 \times 10^{-3}$ | $4.2 \times 10^{-2}$ |
| 2 | 0.015/0.162 | 2.0 | 1.0 | $7.5 \times 10^{-3}$ | $8.1 \times 10^{-2}$ |
| 3 | 0.022/0.237 | 2.5 | 1.0 | $8.8 \times 10^{-3}$ | $9.4 \times 10^{-2}$ |
| 4 | 0.029/0.354 | 2.5 | 1.0 | $1.2 \times 10^{-2}$ | $1.4 \times 10^{-1}$ |
| Comparative sample: | | | | | |
| 1 | 0.029/0.354 | 1.5 | 1.0 | $1.9 \times 10^{-2}$ | $2.4 \times 10^{-1}$ |
| 2 | 0.015/0.162 | 2.0 | 2.0 | $7.5 \times 10^{-3}$ | $8.1 \times 10^{-2}$ |
| 3 | " | — | 1.0 (single layer) | — | |
| 4 | " | 3.0 single layer | — | — | |
| 5 | " | 0.2** | 3.0 | — | |
| 6 | 0.008/0.688 | 1.5** | 1.0 | $3.2 \times 10^{-3}$ | $4.6 \times 10^{-1}$ |

*First layer: Coating material B
Second layer: Coating material A
**Subbing layer C

TABLE 2

| Sample No. | D/O | LumiS/N (dB) | C-out (dB) | RF envelope (%) |
|---|---|---|---|---|
| Present invention: | | | | |
| 1 | 2 | +0.9 | +0.8 | 98 |
| 2 | 4 | +0.8 | +0.8 | 97 |
| 3 | 3 | +0.3 | +0.4 | 97 |
| 4 | 2 | 0 | 0 | 99 |
| Comparative sample: | | | | |
| 1 | 106 | −0.2 | −0.9 | 92 |
| 2 | 3 | +0.8 | +0.4 | 47 |
| 3 | 163 | −1.0 | −1.8 | 93 |
| 4 | 63 | −1.2 | −1.6 | 89 |
| 5 | 41 | −0.2 | −0.6 | 88 |
| 6 | 420 | −2.7 | +0.9 | 42 |

As is evident from Table 2, the video tapes as provided according to the examples of the present invention show superior electromagnetic conversion characteristics and less dropouts.

In the above table, the RF envelope is a representation of the goodness of contact with a head of a video tape deck, and commonly known to be deeply concerned with the coefficient of friction or stiffness of tapes. The present inventors, however, found through experimental routes that this RF envelope may change also depending on the dry thickness of the magnetic layer. Thus it follows that it is not desirable for the magnetic layer to be excessively large in thickness in order to lessen the surface roughness, and therefore required for the layer to have an appropriate coating thickness. Samples 1 to 4 according to the examples of the present invention are appropriate in coating thickness and also show good RF envelope. On the other hand, the comparative sample No. 2 has so large coating thickness that it has caused a defective RF envelope. The comparative sample No. 1 has so excessively large roughness of the non-magnetic support, compared with the coating thickness of the lower layer, that it has brought about an increase in D/O and a lowering of electromagnetic characteristics (in particular, a poor output for the chroma which is one of the low-frequency characteristics).

Similarly, the comparative samples Nos. 3 and 4, comprising a single upper or lower layer, show very poor electromagnetic characteristics. In the comparative sample No. 5 also, the subbing layer used therein is seen to have no power to improve the characteristics.

Characteristics measuring methods:
(1) Ra: Measured using a roughness analyzer, SE-3FK, manufactured by Kosaka Kenkyusho. (Cut-off value: 0.25 mm)
(2) Rmax: Ditto.
(3) D/O (dropout): Using a dropout counter VD-5M, manufactured by Victor Co. of Japan, Ltd., measurement was made over the whole length, assuming as one dropout the lowering of output that occurred for 15 μsec or longer and by 20 dB or more as the output for the RF envelope, and average values per minute were determined.
(4) LumiS/N: Measured using a color-video noise meter Shibasoku 925 D, manufactured by Shibasoku Co.
(5) C-Cut: Measured using an alternate-current voltmeter M-170, manufactured by N. F. Kairo Sekkei Block (unit: dB).
(6) RF envelope: Each video tape is travelled using a VHD deck (manufactured by JVC; S-7000), and RF envelopes are displayed on an oscilloscope (manufactured by Hitachi Ltd.). A photographs of the picture of the oscilloscope is taken to read the maximum value and minimum value of the envelopes, thereby examining their ratios.

Example 2

Samples of magnetic tapes were prepared according to the following coating material formulations A', B' and C'. In the formulations, "part(s)" is all by weight.

| | |
|---|---|
| Magnetic coating material A': | |
| Co-$\gamma Fe_2O_3$ (Hc = 900 Oe; BET 50 m$^2$/g; average particle diameter: 0.2 μm) | 100 parts |
| Potassium sulfonate-containing vinyl chloride resin | 10 parts |
| Polyester polyurethane | 5 parts |
| α-$Al_2O_3$ (average particle diameter: 0.2 μm) | 5 parts |
| Carbon black | 1 part |
| Myristic acid | 1 part |
| Stearic acid | 1 part |
| Butyl stearate | 1 part |
| Methyl ethyl ketone | 100 parts |
| Cyclohexane | 100 parts |
| Toluene | 100 parts |

The above coating material was mixed and dispersed, and 5 parts of Collonate (a product of Nippon Polyurethane Industry Co., Ltd.) was added. Thus, magnetic coating material A' was obtained.

Magnetic coating material B':

| | |
|---|---|
| Co-γFe$_2$O$_3$ (Hc = 700 Oe; BET 40 m$^2$/g; average particle diameter: 0.3 μm) | 100 parts |
| Potassium sulfonate-containing vinyl chloride resin | 10 parts |
| Polyester polyurethane | 5 parts |
| α-Al$_2$O$_3$ (average particle diameter: 0.2 μm) | 5 parts |
| Carbon black | 1 part |
| Myristic acid | 1 part |
| Stearic acid | 1 part |
| Butyl stearate | 1 part |
| Methyl ethyl ketone | 100 parts |
| Cyclohexane | 100 parts |
| Toluene | 100 parts |

The above coating material was mixed and dispersed, and 5 parts of Collonate (a product of Nippon Polyurethane Industry Co., Ltd.) was added. Thus, magnetic coating material B' was obtained.

Coating material C':

| | |
|---|---|
| Carbon black (average particle diameter: 20 μm) | 100 parts |
| Sodium sulfonate-containing polyester | 10 parts |
| Methyl ethyl ketone | 100 parts |
| Toluene | 100 parts |

The above coating material was mixed and dispersed. Thus coating material C' was obtained.

Using these coating materials and under conditions as shown in Table 3, the magnetic coating materials A' and B' were coated on a polyethylene terephthalate support, using simultaneous or successive wet coating, and the resulting magnetic layers were subjected to orientation, followed by calendering. The coating material C' was then coated on the opposite side of the magnetic layers, and dried. Samples Nos. 5 to 8 of the present invention were thus prepared.

TABLE 3

| Sample No. | Layer constitution | Coating thickness (μm) | Coating method | Orientation |
|---|---|---|---|---|
| Present invention: | | | | |
| 5 | A'/B' | 1.5/2.0 | Wet-on-wet | Multi-stage |
| 6 | A'/B' | 1.0/2.0 | " | " |
| 7 | A'/B' | 0.5/2.0 | " | " |
| 8 | A'/B' | 0.5/0.5 | " | " |

Tests were made on these samples to respectively evaluate their magnetic characteristics and durability to obtain the results as shown in Table 4.

TABLE 4

| Sample No. | Coating performance | Squareness ratio | CN (dB) 4.5 MHz | CN (dB) 6.0 MHz | CN (dB) 8.0 MHz | Dropouts (Number/min.) |
|---|---|---|---|---|---|---|
| Present invention: | | | | | | |
| 5 | good | 0.85 | 1.9 | 2.6 | 2.8 | 3 |
| 6 | " | 0.87 | 2.0 | 2.7 | 2.9 | 2 |
| 7 | " | 0.90 | 2.1 | 2.8 | 3.0 | 4 |
| 8 | " | 0.91 | 2.2 | 2.9 | 3.1 | 3 |

Squareness ratio: Determined using VSM-III, manufactured by Toei Kogyo, and based on the equation:
Squareness ratio = Br/Bm,
Bm: Saturated magnetic density
Br: Residual magnetic density
C/N: Noise ratios of reproduction outputs at the time the recording is made using recording signals with the respective single frequencies of 4.5 MHz, 6.0 MHz and 8.0 MHz are measured using a spectrum analyzer. (The value N is measured at the position 1 MHz lower than the recording signals.)
Dropouts: To a given zone (10 to 30 m) on the magnetic recording medium, 100% white signals are inputted, and reproduced. Dropouts at that time, of 15 μs at −12 dB levels are measured at intervals of 1 minute using a counter (Model VHO1BZ) manufactured by Shibasoku Co., and average values over the whole length of the measured areas are used as measured values.

As is evident from Table 4, it was found that the multi-layer magnetic recording medium of the present invention shows a high squareness ratio at the magnetic layer, and also that the employment of simultaneous or successive wet coating has achieved a great improvement in electromagnetic conversion characteristics, and still also that the multi-layer structure taken as shown in the examples of the present invention brings about a great improvement in the level of dropout.

What is claimed is:

1. A magnetic recording medium comprising a non-magnetic support and, provided thereon in order, a first magnetic layer and a second magnetic layer each containing a magnetic material and a binder, wherein Rmax, a maximum roughness, and Ra, a center line average roughness, of a surface of the support on the magnetic layer side, $d_1$, a thickness of the first magnetic layer, and $d_2$, a thickness of the second magnetic layer, have the following relation, $$4 \times 10^{-3} \leq Ra/d_1 \leq 1.8 \times 10^{-2}$$

$$4 \times 10^{-2} \leq Rmax/d_1 \leq 4.5 \times 10^{-1}$$

$$d_2 \leq 1.0 \mu m$$

2. The medium of claim 1, wherein said $d_1$ is 1.0 to 3.0 μm.

3. The medium of claim 1, wherein said $d_2$ is 0.1 to 1.0 μm.

4. The medium of claim 1, wherein the Ra/$d_1$ and Rmax/$d_1$ have the following relation, $$4.5 \times 10^{-3} \leq Ra/d_1 \leq 1.0 \times 10^{-2}$$

$$7.0 \times 10^{-2} \leq Rmax/d_1 \leq 3.0 \times 10^{-1}$$

5. The medium of claim 1, wherein said binder includes vinyl chloride-vinyl acetate copolymer, acrylic resins, phenolic resins, epoxy resins, polyamide resins, butadiene resins, styrene-butadiene copolymer, urethane elastomers, isocyanate curable resins and polyamine resins.

6. The medium of claim 1, wherein said binder has a polymerisation degree of 100 to 10,000.

7. The medium of claim 1, wherein the binder content of said magnetic layer is 1 to 50% by weight of the magnetic material content.

8. The medium of claim 1, wherein the binder content of said magnetic layer is 5 to 30% by weight of the magnetic material content.

9. The medium of claim 1, wherein said binder has a glass transition point of −25° to 100° C.

10. The medium of claim 1, wherein said binder has a glass transition point of 10° to 80° C.

11. The medium of claim 1, wherein a specific surface area of said magnetic material has a BET value of 30 to 70 m²/g.

12. The medium of claim 1, wherein a specific surface area of said magnetic material has a BET value of 40 to 65 m²/g.

13. The medium of claim 1, wherein said magnetic layer further contains isocyanates as a hardening agent.

14. A method of manufacturing a magnetic recording medium comprising a non-magnetic support and, provided thereon in order, a first magnetic layer and a second magnetic layer each containing a magnetic material and a binder wherein Rmax, a maximum roughness, and Ra, a center line average roughness, of a surface of the support on the magnetic layer side, $d_1$, a thickness of the first magnetic layer, and $d_2$, a thickness of the second magnetic layer, have the following relation, $$4 \times 10^{-3} \leq Ra/d_1 \leq 1.8 \times 10^{-2}$$

$$4 \times 10^{-2} \leq Rmax/d_1 \leq 4.5 \times 10^{-1}$$

$$d_2 \leq 1.0 \mu m$$

by coating layers on the support with a solution.

15. The method of claim 14, wherein layers are coated on the support with a solution simultaneously.

16. The method of claim 14, wherein layers are coated on the support with a solution while each layer is wet.

17. The method of claim 14, wherein layers are coated on the support with a solution simultaneously, followed by a plurality of orientations.

18. The method of claim 14, wherein layers are coated on the support with a solution while each layer is wet, followed by a plurality of orientations.

* * * * *